(12) United States Patent
Hooper et al.

(10) Patent No.: US 7,441,245 B2
(45) Date of Patent: Oct. 21, 2008

(54) PHASING FOR A MULTI-THREADED NETWORK PROCESSOR

(75) Inventors: Donald F. Hooper, Shrewsbury, MA (US); Mark Rosenbluth, Uxbridge, MA (US); Debra Bernstein, Sudbury, MA (US); Michael F. Fallon, Mendon, MA (US); Sanjeev Jain, Shresbury, MA (US); Gilbert M. Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 958 days.

(21) Appl. No.: 10/642,053

(22) Filed: Aug. 14, 2003

(65) Prior Publication Data

US 2005/0039182 A1 Feb. 17, 2005

(51) Int. Cl.
*G06F 9/46* (2006.01)
*G06F 9/30* (2006.01)
*G06F 9/00* (2006.01)

(52) U.S. Cl. ............... 718/107; 718/108; 712/219; 712/220; 709/250

(58) Field of Classification Search ......... 718/100–108; 712/11–12, 225–235, 219–220; 709/250
See application file for complete search history.

(56) References Cited

U.S. PATENT DOCUMENTS

| | | | | |
|---|---|---|---|---|
| 6,507,862 B1 * | 1/2003 | Joy et al. | ............ | 718/107 |
| 6,532,509 B1 * | 3/2003 | Wolrich et al. | ............ | 710/240 |
| 6,633,865 B1 * | 10/2003 | Liao | ............ | 707/3 |
| 6,836,808 B2 * | 12/2004 | Bunce et al. | ............ | 710/20 |
| 7,000,048 B2 * | 2/2006 | McAlpine et al. | ............ | 710/200 |
| 7,085,274 B1 * | 8/2006 | Rahim et al. | ............ | 370/394 |
| 7,325,099 B2 * | 1/2008 | Jain et al. | ............ | 711/137 |
| 7,360,064 B1 * | 4/2008 | Steiss et al. | ............ | 712/219 |
| 2001/0000046 A1 * | 3/2001 | Wright et al. | ............ | 712/11 |
| 2003/0023835 A1 * | 1/2003 | Kalafatis et al. | ............ | 712/214 |
| 2003/0135351 A1 * | 7/2003 | Wilkinson et al. | ............ | 702/186 |
| 2003/0163589 A1 * | 8/2003 | Bunce et al. | ............ | 709/250 |
| 2003/0236919 A1 * | 12/2003 | Johnson et al. | ............ | 709/251 |
| 2003/0236968 A1 * | 12/2003 | Basu et al. | ............ | 712/225 |
| 2005/0005088 A1 * | 1/2005 | Yearsley et al. | ............ | 712/235 |
| 2007/0005942 A1 * | 1/2007 | Vinitzky et al. | ............ | 712/220 |

OTHER PUBLICATIONS

Intel Technology Journal, "Network Processsors", Aug. 15, 2002, pp. 1-93.*
Laudon et al., "Interleaving: A Multithreading Technique Targeting Multiprocessors and Workstations", ACM, 1994, pp. 308-318.*
Ungerer et al., "A Survey of Processors With Explicit Multithreading", ACM, Mar. 2002, pp. 29-63.*

(Continued)

*Primary Examiner*—Meng-Ai An
*Assistant Examiner*—Jennifer N To
(74) *Attorney, Agent, or Firm*—Daly, Crowley, Mofford & Durkee, LLP

(57) ABSTRACT

A method of and apparatus for associating units of data with threads of a multi-threaded processor for processing, and enabling each thread to perform processing for at least two of the data units during a thread execution period. The thread execution period is divided among phases, and each of the data units processed by a thread is processed by a different one of the phases.

26 Claims, 8 Drawing Sheets

OTHER PUBLICATIONS

Adiletta, Matthew, et al., "Packet over Sonet: Achieving 10 Gigabit/sec Packet Processing with an IXP2800", *Intel Technology Journal*, vol. 6, Issue 3, (2002), pp. 29-39.

Johnson, Erik, et al., "IXP1 200 Programming", *Intel Press*, Chapter 13, (2002), pp. 291-311.

* cited by examiner

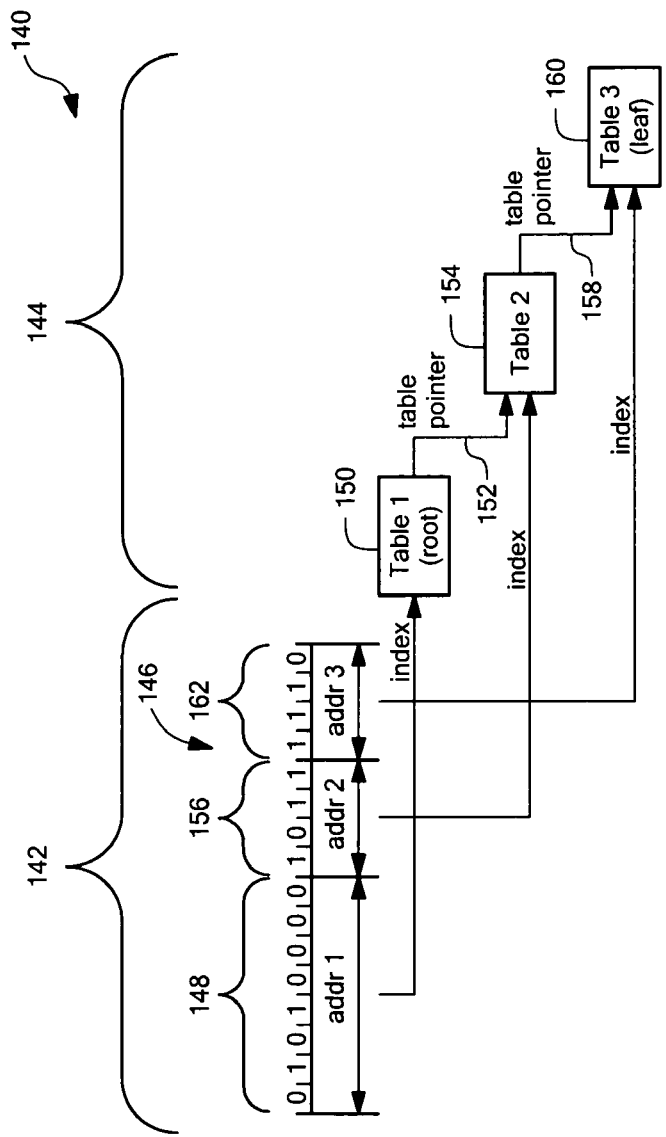
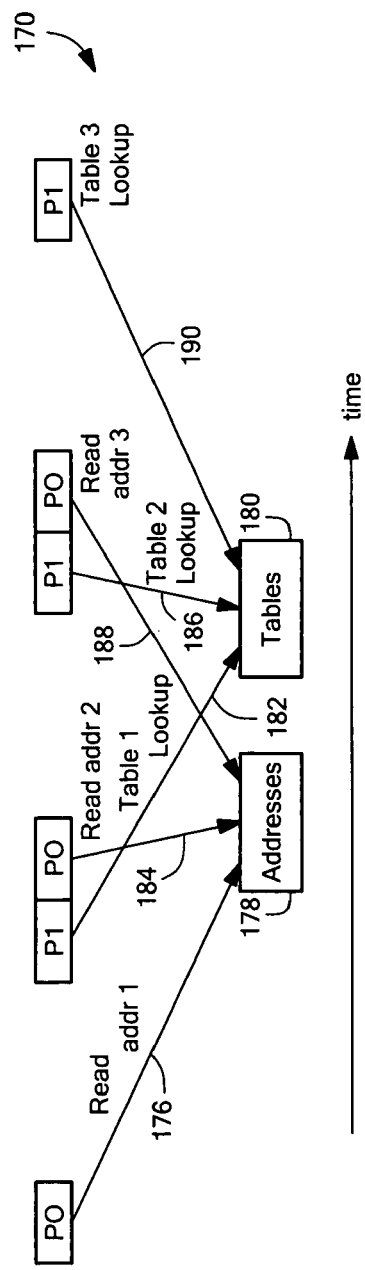
FIG. 9A (PRIOR ART)
FIG. 9B

PHASING FOR A MULTI-THREADED NETWORK PROCESSOR

BACKGROUND

For maximum efficiency, network processors may use multi-threading to process packet data. Packet data processing typically involves writes to and reads from external memory, sometimes resulting in memory latency inefficiencies. Multi-threading can be used to hide the latency of external memory references of one thread behind the execution cycles of other threads, but only when the total time of the execution cycles is at least as great as that of the external memory reference. Quite often, however, the external memory access time exceeds the total execution time of the other threads. As total execution time relative to external memory latency will decrease as network processor clock rates increase, this problem will only worsen in the future.

DESCRIPTION OF THE DRAWINGS

FIGS. 9A and 9B are diagrams illustrating an exemplary application of interleaved threading to hierarchical tree searches.

DETAILED DESCRIPTION

Figure 1:
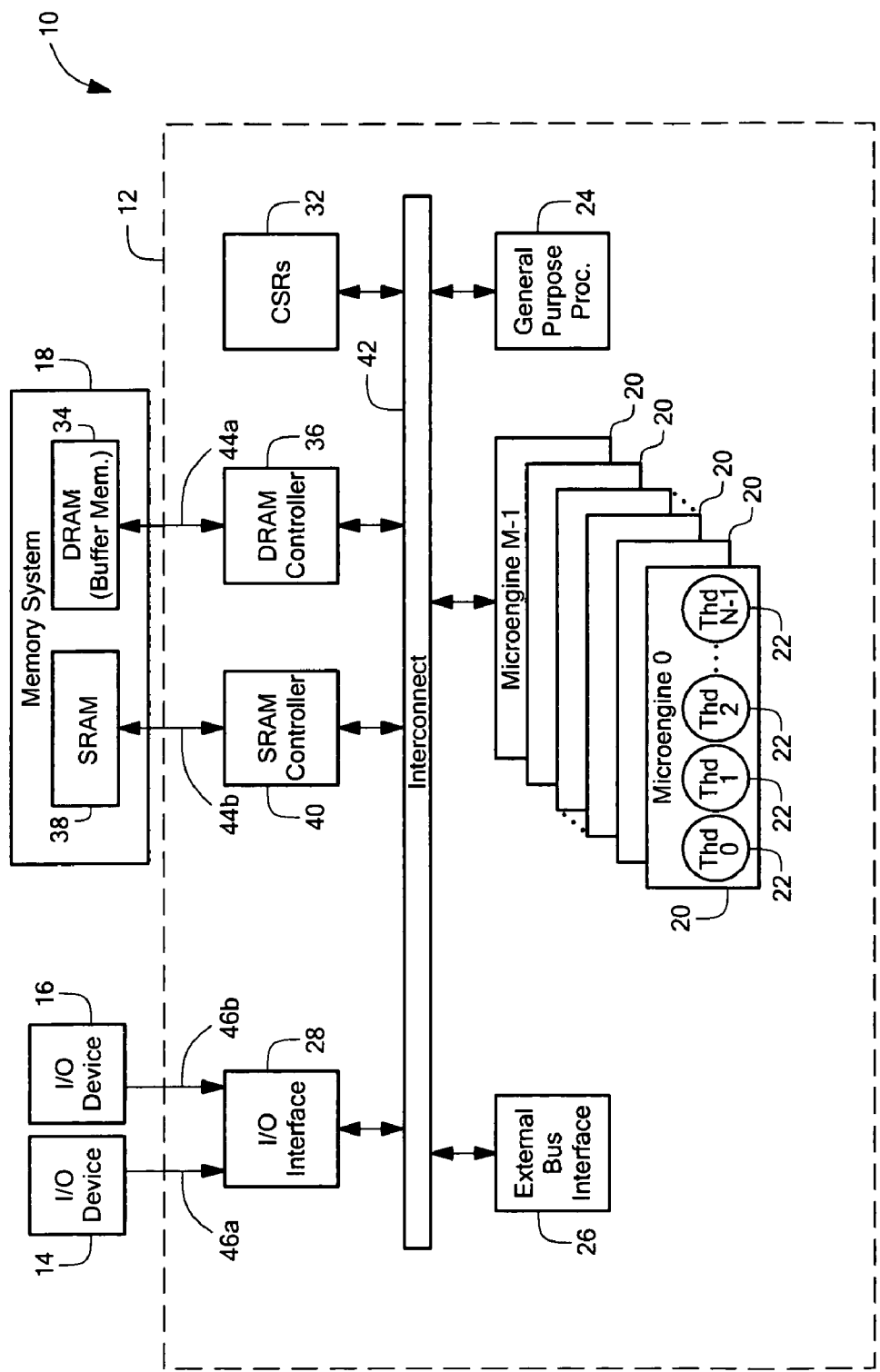
FIG. 1 is a block diagram of a system employing a processor having multi-threaded microengines (MEs) to support multiple threads of execution.

Referring to FIG. 1, a system 10 includes a processor 12 coupled to one or more I/O devices, for example, I/O devices 14 and 16, as well as a memory system 18. The processor 12 includes one or more processors ("microengines" or "MEs") 20, each with multiple hardware controlled execution threads 22. In the example shown, there are "M" microengines 20, and each of the microengines 20 is capable of processing multiple threads 22, as will be described more fully below. In the described embodiment, the maximum number "N" of threads supported by the hardware is eight. In a multi-ME implementation, each of the microengines 20 can communicate with the other microengines.

In one embodiment, the processor 12 also includes a processor 24 that assists in loading microcode control for the microengines 20 and other resources of the processor 12, and performs other general-purpose computer type functions such as handling protocols and exceptions. In network processing applications, the processor 24 can also provide support for higher layer network processing tasks that cannot be handled by the microengines 20.

The microengines 20 each operate with shared resources including, for example, the memory system 18, an external bus interface (e.g., a Peripheral Chip Interconnect or "PCI" bus interface) 26, an I/O interface 28 and Control and Status Registers (CSRs) 32. The I/O interface 28 is responsible for controlling and interfacing the processor 12 to the network devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., processing of payloads from network packets. In a networking implementation, the SRAM 38 and SRAM controller 40 are used for low latency, fast access tasks, e.g., accessing look-up tables, storing buffer descriptors and free buffer lists, and so forth.

When the processor 12 is used as a network processor, the I/O devices 14 and 16 can be any network devices capable of transmitting and/or receiving network traffic data, such as framing/MAC devices, e.g., for connecting to 10/100BaseT Ethernet, Gigabit Ethernet, ATM or other types of networks, or devices for connecting to a switch fabric. For example, in one arrangement, the I/O device 14 could be an Ethernet MAC device (connected to an Ethernet network, not shown) that transmits data to the processor 12 and device 16 could be a switch fabric device that receives processed data from processor 12 for transmission onto a switch fabric. In such an implementation, that is, when handling traffic to be sent to a switch fabric, the processor 12 would be acting as an ingress network processor. Alternatively, the processor 12 could operate as an egress network processor, handling traffic that is received from a switch fabric (via I/O device 16) and destined for another I/O device such as I/O device 14, or network coupled to such device.

Although the processor 12 can operate in a standalone mode, supporting both traffic directions, it will be understood that, to achieve higher performance, it may be desirable to use two dedicated processors, one as an ingress processor and the other as an egress processor. The two dedicated processors would each be coupled to the devices 14 and 16. In addition, each I/O device 14, 16 can include a plurality of ports to be serviced by the processor 12. The I/O interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The I/O interface 28 may include separate receive and transmit blocks, and each may be separately configurable for a particular interface supported by the processor 12.

Other devices, such as a host computer and/or bus peripherals (not shown), which may be coupled to an external bus controlled by the external bus interface 26 can also serviced by the processor 12.

In general, as a network processor, the processor 12 can interface to any type of communication device or interface that receives/sends data. The processor 12 functioning as a network processor could receive units of information from a network device like network device 14 and process those units in a parallel manner, as will be described. The unit of information could include an entire network packet (e.g., Ethernet packet) or a portion of such a packet, e.g., a cell such as a Common Switch Interface (or "CSIX") cell or ATM cell, or packet segment. Other units are contemplated as well. All types of information handled by the MEs 20 will be referred to herein generally as "data units" or data.

Each of the functional units of the processor 12 is coupled to an interconnect 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 2:
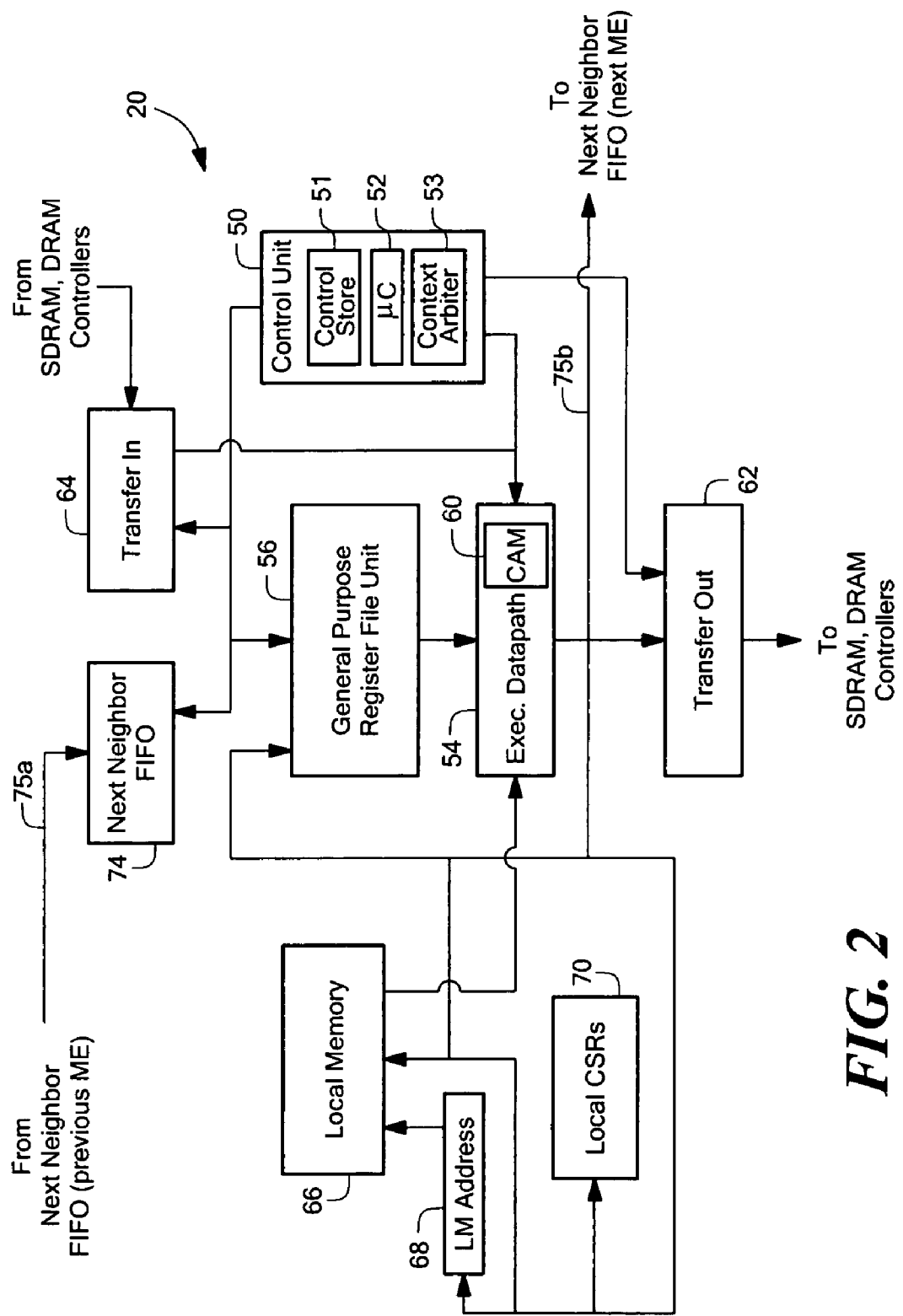
FIG. 2 is a block diagram of an exemplary microengine (ME).

Referring to FIG. 2, an exemplary one of the microengines 20 is shown. The microengine (ME) 20 includes a control unit 50 that includes a control store 51, control logic (or microcontroller) 52 and context arbiter/event logic 53. The control store 51 is used to store a microprogram. The microprogram may be loadable by the processor 24.

The microcontroller 52 includes an instruction decoder and program counter units for each of the supported threads. The context arbiter/event logic 53 can receive messages from any of the shared resources, e.g., SRAM 38, DRAM 34, or processor core 24, and so forth. These messages provides information on whether a requested function has been completed.

The microengine 20 also includes an execution datapath 54 and a general purpose register (GPR) file unit 56 that is coupled to the control unit 50. The datapath 54 may include a number of different datapath elements, e.g., a Content Addressable Memory (CAM) 60, as well as an ALU and a multiplier (not shown).

The registers of the GPR file unit 56 (or "GPRs")are read and written exclusively under program control. The GPRs, when used as a source in an instruction, supply operands to the datapath 54. When used as a destination in an instruction, they are written with the result of the datapath 54. The instruction specifies the register number of the specific GPRs that are selected for a source or destination. Opcode bits in the instruction provided by the control unit 50 select a datapath element to perform the operation defined by the instruction.

The microengine 20 further includes a write transfer register file 62 and a read transfer register file 64. The write transfer register file 62 stores data to be written to a resource external to the microengine (for example, the DRAM memory or SRAM memory). The read transfer register file 64 is used for storing return data from a resource external to the microengine 20. Both of the transfer register files 62, 64 are connected to the datapath 54, as well as the control store 50. Also included is a local memory 66. The local memory 66, which is addressed by registers 68, can supply operands to the datapath 54 and receive results from the datapath 54 as a destination.

The microengine 20 also includes local control and status registers (CSRs) 70, coupled to the transfer registers, for storing local inter-thread and global event signaling information, as well as other control and status information. Other storage and functions units may be included in the microengine as well.

Also provided in the microengine 20 is are next neighbor registers (shown as a FIFO) 74, coupled to the control store 50 and the execution datapath 54, for storing information received from a previous neighbor ME in pipeline processing over a next neighbor input signal 75a, or from the same ME, as controlled by information in the local CSRs 70. A next neighbor output signal 75b to a next neighbor ME in a processing pipeline can be provided under the control of the local CSRs 70.

Figure 3:
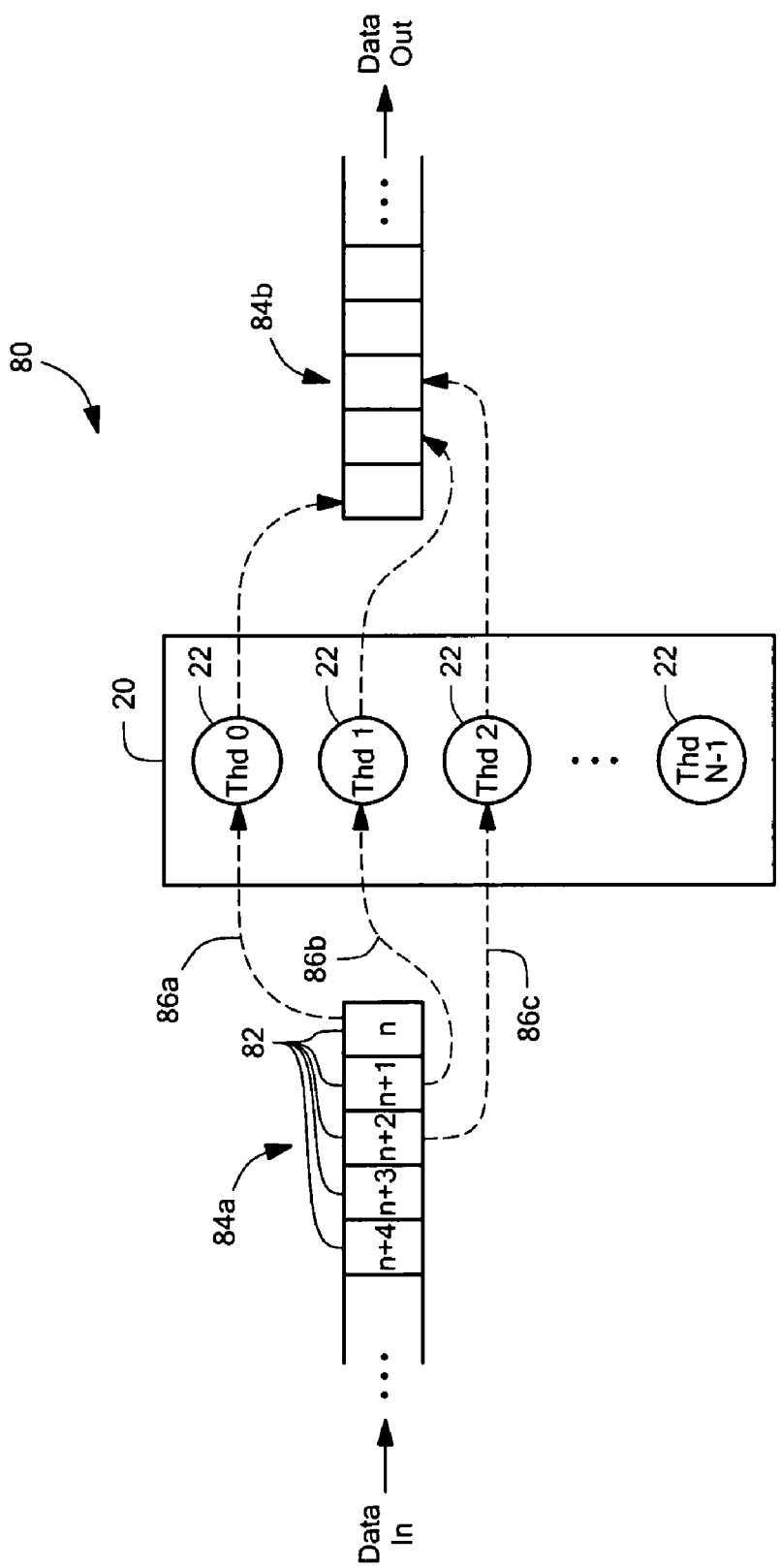
FIG. 3 is a depiction of an exemplary assignment of incoming data units to available threads in an ME.
Figure 4:
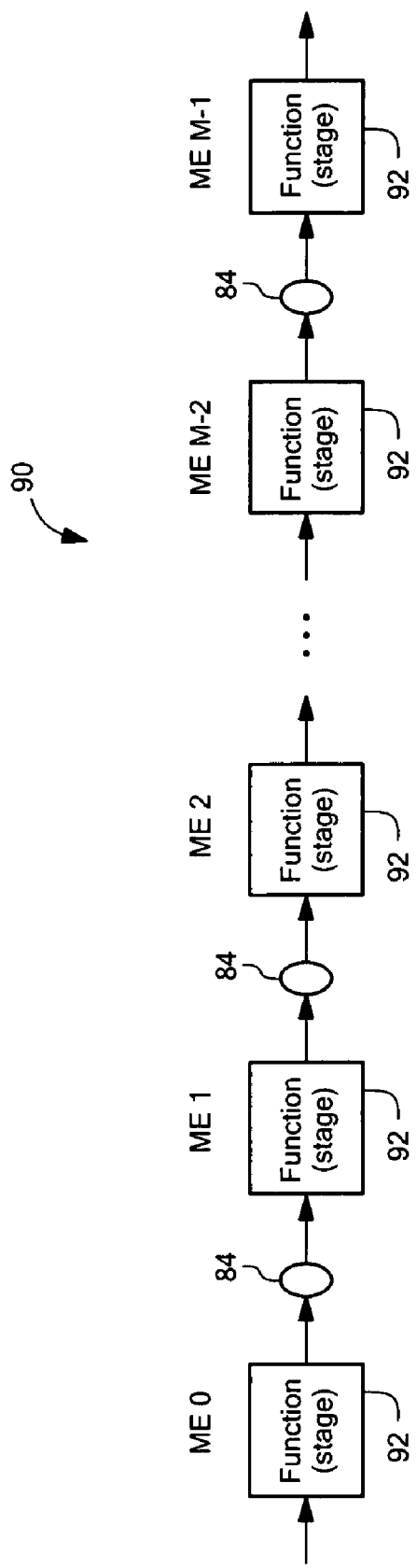
FIG. 4 is a depiction of the microengines (from FIG. 1) as a multi-stage, processing pipeline.

Referring to FIG. 3, an exemplary assignment of data units to threads 80 is shown. The threads 22 of the ME 20 perform the same function but operate on different data. Units of data can be associated with threads for processing in various ways. For example, as shown, threads can read units of data 82 to be processed from a buffer 84a, for example, a queue or ring, where the data has been stored by another ME (or by the I/O interface or a receive driver).

The threads 22 execute in sequential order, and each thread reads data to be processed during that thread's execution time. Thus, for N threads, the first thread 0 reads a first data unit "data n" (indicated by arrow 86a), the second thread 1 reads the next data unit "data n+1" (arrow 86b), the third thread 2 reads the data unit "data n+2" (arrow 86c), and so on. As each thread completes its works on a data unit, it writes the results of that processing to a second buffer 84b. The buffers 84a, 84b may reside in the memory system 18, for example, in the SRAM 38, or in the SRAM controller 40. Alternatively, a single buffer residing in the ME itself, for example, the nearest neighbor FIFO 74, could be used to transfer data between MEs.

In one exemplary embodiment, as shown in FIG. 3, the processor 12 is configured to operate as a processing pipeline 90. In such an arrangement, the processor application is split into a series of sequential functions or processing stages, indicated generally as stages 92, which are mapped onto different MEs. In a network application, data such as packet data is operated on by the threads of the various MEs according to the functions of those stages. Although not shown, it will be appreciated that some or all of the functions in an application may implemented on a single ME, and multiple MEs may be configured to execute that application code.

The functionality of an ME stage 92, and therefore, the threads 22 of that stage, is determined by microcode loaded for a particular user's application into each microengine's control store 51. For example, in one exemplary networking application thread/stage function assignment, one or more stages could be assigned to handle receive and packet processing functions, such as scheduling, packet processing, metering, classification and congestion avoidance. Other stages could be assigned to handle transmit-related functions, for example, threads of one stage could be configured for transmit scheduling and queue management while threads of another stage (or stages) could be configured to perform a transmit function.

As discussed above, threading can be used to hide memory references of one thread behind execution cycles of other threads. In the ideal case, the total time of the execution cycles (such as compute cycles) covers the memory references. In many cases, however, a memory reference will exceed the total time of the compute cycles so it can't be hidden. This problem, known as latency bound threading, is illustrated in FIG. 5.

Figure 5:
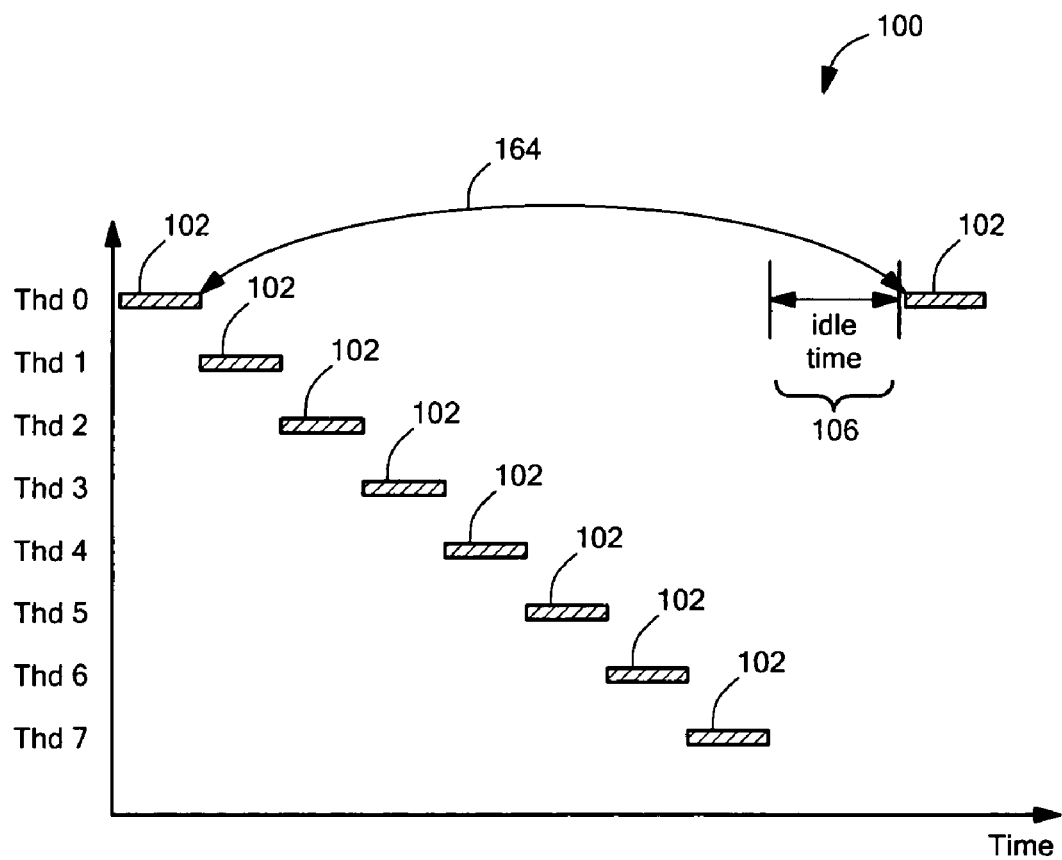
FIG. 5 is an illustration of latency bound multi-threaded processing.

Turning to FIG. 5, a multi-threaded processing over time 100 is shown. In this example, each thread's total processing time is divided into two execution periods, the being used for reads and the second being used for a modify-writes. In the time-wise progression of execution cycles by eight threads ("Thd 0", "Thd 1", . . . , "Thd 7"), the first thread (Thd 0) executes for some number of cycles (execution time 102), issuing a dependent memory reference 104 to external memory, for example, SRAM 38, during the first execution period. The first thread goes to sleep while the other threads perform their work during their respective execution times 102. When the last thread (Thd 7) has completed processing, it signals to Thd 0 to transition from a sleep state to an executing state to continue its processing in the second execution period. It can be seen that the total of the execution times 102 of the other threads is less than the completion time of the memory reference 104 by the first thread. As a result, the first thread receives the signal (from last thread Thd 7) to begin its modify-write operation before data has been returned to it by the external memory access operation. As a result, the first thread stalls for some number of idle cycles (idle time 106) as it waits.

Figure 6:
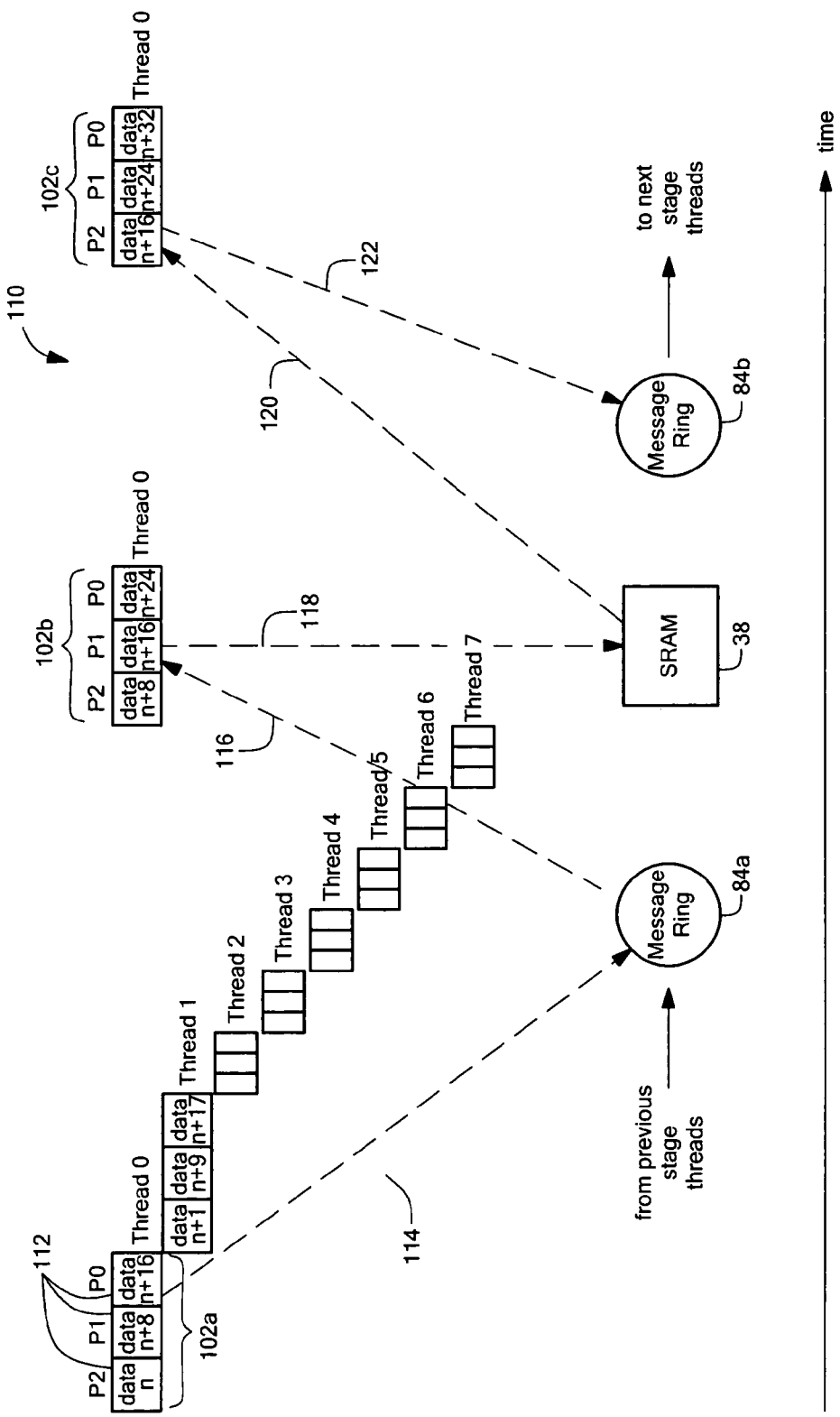
FIG. 6 is a depiction of ME multi-threaded processing using thread interleaving for multiple phases.

Now referring to FIG. 6, a multi-thread processing that uses "interleaved threading", indicated by reference numeral 110, is shown. Interleaved threading assigns two or more processes ("phases") 112, shown here as three phases P0, P1 and P2, to each thread so that the thread can operate on multiple data units 82 during one execution time 102. Because each thread processes more than one data unit, the total instruction cycle time allows a memory reference of a first thread to be hidden behind the execution cycles of the other threads, which are processing multiple packets as well. Because more execution cycles are performed by each thread, the memory reference by the first thread is completed prior to that thread entering a next phase and it need not wait on the memory reference completion. Thus, because interleaved threading enables the processing of two or more data units to be interleaved on one thread, the processor 12 avoids the latency bound threading problem illustrated in FIG. 5.

FIG. 6 shows the multi-phase sequencing performed by the threads of a given ME during a pipeline stage processing time. As indicated earlier, all of the threads of the ME perform the same function, and thus the same set of tasks. One thread runs for some number of cycles "p", and then swaps out. The next thread to execute instantly swaps in. The p-cycle execution period is divided into k phases. In the illustrated example of FIG. 6, the number of phases k is three.

The tasks performed by the phases 112 for the illustrated example are explained with reference to the processing of a third data unit interleaved on thread 0, "data n+16". The first phase P0 issues a read command to the first buffer 84*a* (shown as message ring 84*a*) to read a message or information, including an address (indicated by arrow 114). The second phase P1 receives the read data for that data unit (indicated by arrow 116). The phase P1 then performs a second dependent read by issuing a read command to read from the SRAM 38 at the address provided by the data returned by the first read (indicated by arrow 118). When thread enters the third phase P2 for the data n+16 processing, the thread receives the data returned by the read of P1 (indicated by arrow 120). The thread performs a modify-write (indicated by arrow 122) by performing some type of computation using the results of the previous read and writing the modified results to the second buffer (message ring) 84*b*. The results are stored in the second buffer 84*b* for later retrieval by another ME stage.

In the first execution period shown, execution period 102*a*, before the thread 0 performs the P0 processing for data n+16, it performs the P2 phase for data n and the P1 phase for data n+8 (the P0 phase for data n+8 and the P0 and P1 phases for n having been performed earlier in previous execution periods, and not shown here). During the following execution period 102*b*, the thread performs the P2 phase for data n+8, the P1 phase for data n+16 and performs a P0 phase for a new data unit, data n+24. In the execution period 102*c* which follows, the thread completes the processing for data n+16 for its P2 phase, performs P1 for data n+24 and performs a P0 phase for new data unit "data n+32").

After thread 0 completes the processing during execution period 102*a*, during which it begins the processing of a new data unit, each of the threads executes in turn, one after another, each processing a new data unit and interleaving the processing of that new data unit with the processing of two other data units (already in progress) in their respective execution periods 102*a*. This processing pattern repeats in subsequent execution periods.

Thus, during a given execution processing time across all threads, where processing is performed for three phases by eight different threads, three tasks are in process on a single thread context and twenty-four tasks are in process on all thread contexts. Task execution is spread across k execution periods for k phases. Interleaved threading is particularly well-suited for multiple phases in a narrow cycle period to support a high throughput on a single task.

Assuming the execution periods are 50 cycles in duration with the phase-sequenced processing, the overall read latency associated with the processing during an execution period may be greater than 100 cycles, possibly as much as 350 cycles, without slowing throughput.

Figure 7:
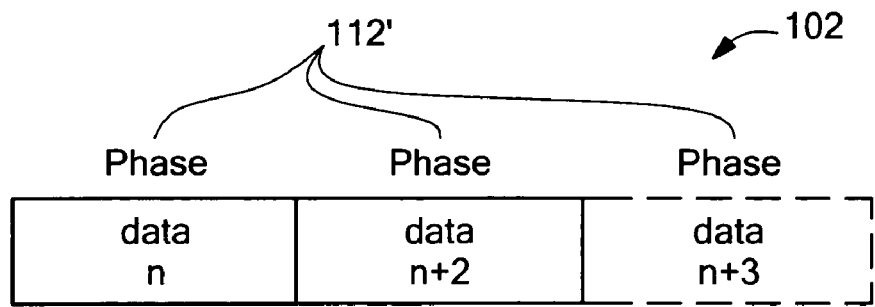
FIG. 7 is a depiction of thread interleaving for a minimum of two phases as applied to consecutive data units.

The illustration in FIG. 6 assumes that data units are associated with threads in the sequence described earlier with reference to FIG. 3. In an alternative implemenation, as shown in FIG. 7, the execution period 102 can be divided into two or more phases 112, shown here as phases 112', which correspond to the processing of consecutive units of data, for example, data n, data n+2 (and data n+3 for a third phase, if used). Phase sequencing of this type can be used as long as there are no conflicts between the phases in accessing shared data structures in the external memory.

Figure 8:
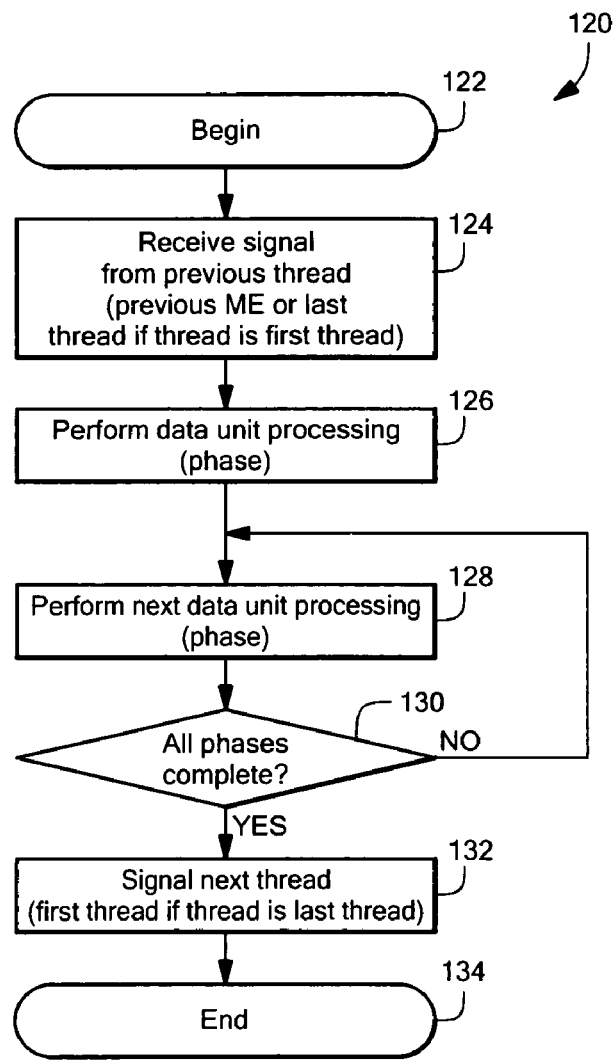
FIG. 8 is a flowchart that shows a per-thread phase-sequenced processing for a single thread processing during a single execution period.

FIG. 8 shows a per-thread phase-sequenced processing 120 for a single thread processing during a single execution period. The thread begins 122 when it receives 124 a signal from a previous thread, or if the thread is thread 0, from the previous ME or last thread of the previous execution period. The thread enters a first phase and performs 126 a data unit processing. The thread enters a second phase and performs 128 a next data unit processing during that next phase. At 130, the thread determines if all phases are complete. If they are not, the thread returns to 128 to perform the next data unit processing during yet another phase. If all of the phases are complete, the thread signals 132 the next thread (which is the first thread if the thread that is currently executing is the last thread) and ends 134 the current execution period.

The interleaved threading concept can be extended to any number of phases, provided that the duration of a thread execution time can be divided among the phases. The phases may be executed in reverse order, last first and first last, as illustrated in FIG. 6. Although the phases are represented in FIGS. 6 and 7 as being equal in duration, the phases may be of different durations as required by the different tasks to be performed by those phases.

Two or more phases per thread requires that state be maintained for each of the phases. Thus, and referring back to FIG. 2, to enable interleaved threading, the allocation of context registers in the the GPR file unit 56 and local CSRs supports two or more phases per thread.

It will be appreciated that the interleaving can be applied to any function that uses dependent memory references. One example is a hierarchical tree search. A particular use of a hierarchical tree search is Longest Prefix Matching (LPM), which is the problem of determining from a set of strings the longest one that is a prefix of some other, given string. It is at the heart of many applications, for example, IP routing for IP route lookups and telephone network management for telephone number classifications by applications, to name but a few.

FIG. 9A shows a simple example of a hierarchical tree search 140 for LPM. It includes an address read portion 142 and a table lookup portion 144 operating on a given string 146. Some number of left-most bits corresponding to a first address portion 148 ("addr1") are read and then used as an index into a top or root level table 150 ("table 1"). The corresponding table entry in that table may provide a table pointer 152 that points to another table, shown in the FIG. as table 154 ("table 2"). A read of some number of next left-most bits provides a second address portion 156 ("addr2"), which is used to index into table 154. The corresponding entry in table 154 may provide a table pointer 158 to yet another table, shown as table 160 ("table 3"). In the example shown, table 160 is a leaf table. This table is indexed by a third address portion 162 ("addr3"). The corresponding entry provides the results of the search. Typically, internal tables such as tables 150 and 152 are kept in a node array and leaf tables such as table 160 are kept in a separate leaf array.

FIG. 9B shows a hierarchical tree search for LPM (such as that illustrated in FIG. 9A), but implemented as a phase-sequenced search 170 with two phases 172 and 174. An address read is performed by phase P0 and a table lookup is performed by phase P1. Thus, the search begins by providing a read command to read "addr1" (indicated by arrow 176) from a memory for storing addresses 178 (for example, a ring) during a first execution period. During the next execution period, a read command for a lookup of table 1 in tables memory 180 using addr1 as a table index is issued by phase P1 (as indicated by arrow 182). For phase P0, the search issues a read command to read "addr2" from the address memory 178 (indicated by arrow 184). During the following execution period, the search performs the table 2 lookup using addr2 (indicated by arrow 186) for phase P1 and then provides a read command to read "addr3" for phase P0 (indicated by arrow 188). During the last execution period, the search performs the table 3 lookup using addr3 as a table index (indicated by arrow 190). Thus, over the course of the search processing period, the phases implement a hierarchical tree search, with the phases descending from tree root to leaf.

Other embodiments are within the scope of the following claims.

What is claimed is:

1. A method comprising:
  associating units of data with threads of a multi-threaded processor for processing; and
  enabling each thread to perform processing for at least two of the data units during a thread execution period;
  wherein a first data unit is processed in a first phase of a first thread within a first thread execution period and is processed by a second phase of the first thread within a second thread execution period, and a second data unit is processed in a phase different from the first phase of the first thread within the first thread execution period and processed by a phase different from the second phrase of the first thread within the second execution period.

2. The method of claim 1 wherein the thread execution period is divided among phases, and each of the at least two data units is processed by a different one of the phases.

3. The method of claim 2 wherein the threads execute one at a time in a sequential order.

4. The method of claim 3 wherein the threads are configured to perform a function comprising tasks, and a different one of the tasks is performed by each of phases.

5. The method of claim 4 wherein the tasks comprise at least one dependent memory reference.

6. The method of claim 4 wherein the tasks comprise multiple dependent memory references, each directed to a different memory data structure.

7. The method of claim 4 wherein the function comprises a hierarchical tree search.

8. The method of claim 7 wherein the hierarchical tree search comprises Longest Prefix Matching.

9. The method of claim 1 wherein the data units comprise a sequence of data units, and the at least two data units comprise consecutive data units in the sequence.

10. The method of claim 1 wherein the data units comprise a sequence of data units, and associating comprises associating each data unit with a different one of the threads in order of the sequence.

11. An article comprising:
  a storage medium having stored thereon instructions that when executed by a machine result in the following:
    associating units of data with threads of a multi-threaded processor for processing; and
    enabling each thread to perform processing for at least two of the data units during a thread execution period,
  wherein the thread execution period is divided among phases and each of the at least two data units is processed in a different one of the phases;
  wherein a first data unit is processed in a first phase of a first thread within a first thread execution period and is processed by a second phase of the first thread within a second thread execution period, and a second data unit is processed in a phase different from the first phase of the first thread within the first thread execution period and processed by a phase different from the second phrase of the first thread within the second execution period.

12. The article of claim 11 wherein the threads execute one at a time in a sequential order.

13. The article of claim 12 wherein the threads are configured to perform a function comprising tasks, and a different one of the tasks is performed by each of phases.

14. The article of claim 13 wherein the tasks comprise at least one dependent memory reference.

15. The article of claim 13 wherein the tasks comprise multiple dependent memory references, each directed to a different memory data structure.

16. The article of claim 13 wherein the function comprises a hierarchical tree search.

17. The article of claim 16 wherein the hierarchical tree search comprises Longest Prefix Matching.

18. The article of claim 11 wherein the data units comprise a sequence of data units, and the at least two data units comprise consecutive data units in the sequence.

19. The article of claim 11 wherein the data units comprise a sequence of data units, and associating comprises associating each data unit with a different one of the threads in order of the sequence.

20. A processor comprising:
  an input/output (I/O) interface to receive units of data from a network device;
  one or more multi-threaded processors, coupled to the I/O device, each having multiple threads of execution to process data units received by the I/O device;
  wherein each thread on at least one of the multi-threaded processors is enabled to perform processing for at least two of the data units during a thread execution period and the thread execution period is divided among phases and each of the at least two data units is processed in a different one of the phases;
  wherein a first data unit is processed in a first phase of a first thread within a first thread execution period and is processed by a second phase of the first thread within a second thread execution period, and a second data unit is processed in a phase different from the first phase of the first thread within the first thread execution period and processed by a phase different from the second phrase of the first thread within the second execution period.

21. The processor of 20 wherein the threads execute one at a time in a sequential order.

22. The processor of claim 21 wherein the threads are configured to perform a function comprising tasks, and a different one of the tasks is performed by each of phases.

23. The processor of claim 22 wherein the tasks comprise at least one dependent memory reference.

24. A system comprising:
a network device coupled to a network to receive incoming network traffic;
an input/output (I/O) interface to receive units of data associated with the incoming network traffic from the network device;
one or more multi-threaded processors, coupled to the I/O device, each having multiple threads of execution to process data units received by the I/O device; and
wherein each thread on at least one of the multi-threaded processors is enabled to perform processing for at least two of the data units during a thread execution period and the thread execution period is divided among phases and each of the at least two data units is processed by a different one of the phases,
wherein a first data unit is processed in a first phase of a first thread within a first thread execution period and is processed by a second phase of the first thread within a second thread execution period, and a second data unit is processed in a phase different from the first phase of the first thread within the first thread execution period and processed by a phase different from the second phase of the first thread within the second execution period.

25. The system of claim 24 wherein the threads execute one at a time in a sequential order.

26. The system of claim 25 wherein the threads are configured to perform a function comprising tasks including at least one dependent memory reference, and a different one of the tasks is performed by each of phases.

* * * * *

UNITED STATES PATENT AND TRADEMARK OFFICE
CERTIFICATE OF CORRECTION

PATENT NO.          : 7,441,245 B2                                              Page 1 of 1
APPLICATION NO.     : 10/642053
DATED               : October 21, 2008
INVENTOR(S)         : Hooper et al.

It is certified that error appears in the above-identified patent and that said Letters Patent is hereby corrected as shown below:

On the Title page, in Item (75), in "Inventors", in Col. 1, line 5, delete "Shresbury" and insert -- Shrewsbury --, therefor.

On the Title page, in Item (56), under "Other Publications", in column 2, line 1, delete "Processsors"," and insert -- Processors", --, therefor.

In column 7, line 48, in Claim 1, delete "phrase" and insert -- phase --, therefor.

In column 8, line 25, in Claim 11, delete "phrase" and insert -- phase --, therefor.

In column 8, line 66, in Claim 20, delete "phrase" and insert -- phase --, therefor.

Signed and Sealed this

Thirtieth Day of December, 2008

JON W. DUDAS
*Director of the United States Patent and Trademark Office*